United States Patent [19]
Sonobe

[11] Patent Number: 5,457,741
[45] Date of Patent: Oct. 10, 1995

[54] SUBSCRIBER TRANSMISSION SYSTEM

[75] Inventor: Toshiaki Sonobe, Kawasaki, Japan

[73] Assignee: Fujitsu Limited, Kanagawa, Japan

[21] Appl. No.: 189,411

[22] Filed: Jan. 31, 1994

[30] Foreign Application Priority Data

Sep. 14, 1993 [JP] Japan .................................. 5-227702

[51] Int. Cl.6 .................................................. H04M 19/06
[52] U.S. Cl. ........................ 379/333; 379/334; 379/323; 379/324
[58] Field of Search ....................................... 379/333, 334, 379/230, 323, 324, 322; 370/56, 60.1

[56] References Cited

U.S. PATENT DOCUMENTS

| | | | |
|---|---|---|---|
| 4,371,789 | 2/1983 | Chen et al. | 307/38 |
| 4,539,437 | 9/1985 | Giacopelli et al. | 379/384 |
| 4,571,721 | 2/1986 | Yasui et al. | 379/333 |
| 4,754,480 | 6/1988 | Mattis et al. | 379/333 |
| 5,001,740 | 3/1991 | Takano et al. | 379/334 |
| 5,317,633 | 5/1994 | Hiraiwa | 370/60.1 |

FOREIGN PATENT DOCUMENTS 0483458 5/1992 European Pat. Off. ....... H04Q 11/04

OTHER PUBLICATIONS

Rando, et al., "Power System Design for Fiber to the Home Systems", IEEE LCS, The Magazine of Lightwave Communication Systems, No. 3, Aug. 1990, pp. 17–19.

*Primary Examiner*—James L. Dwyer
*Assistant Examiner*—Scott Wolinsky

[57] ABSTRACT

The arrangement is such that to a transmission apparatus of the subscriber side in a subscriber transmission system wherein the transmission apparatus of the subscriber side which serves a plurality of subscribers and a transmission apparatus connected to a switching system are connected to each other via multiplexed transmission lines, there are provided memories to store originating and terminating call signals, and a controller not only to control so that only subscriber transmitter-receivers corresponding to a specific number of subscribers in the subscriber transmitter-receivers for transmitting and receiving signals of subscribers enter an operating state, but also to cause the memories to operate, so that electric power is supplied only to circuits corresponding to a specific number of subscribers in the transmission apparatus of the subscriber side by controlling through the controller when the rate of telephone use is low.

14 Claims, 7 Drawing Sheets

SUBSCRIBER TRANSMISSION SYSTEM

BACKGROUND OF THE INVENTION

1. Field of the Invention

The present invention relates to a subscriber transmission system for providing telephone service to subscribers located remotely from an exchange office, and more particularly to a subscriber transmission system wherein power supplied to a transmitter of the subscriber side can be reduced when the rate of telephone use is low.

2. Description of the Related Art

A subscriber transmission system is one which concentrates a plurality of subscriber terminals and connects them to an exchange office via optical transmission lines, etc. It is used for the purpose of reduction of transmission loss and construction cost of subscriber lines so that when subscriber terminals are located in places remote from the exchange office, such subscribers can be served by the switching system.

In a thinly populated area, because of the low telephone use rate, it is economically disadvantageous to always supply full electric power to the transmitters of the subscriber side. So, in this case, it is desirable to supply electric power of an amount which corresponds to a specific number of subscribers, so that the amount of consumed electric power may be reduced.

In a conventional subscriber transmission system, since all of the subscriber transmitter-receivers in the transmission apparatus of the subscriber side are connected to subscribers, all of the devices are always supplied with electric power.

However, in the subscriber transmission system, the telephone use rate of the subscribers connected to the subscriber side transmission apparatus is often low. Therefore, there is a problem that supplying all the subscriber transmitter-receivers with electric power results in a waste of electric power supplied in connection with the rate of device use.

SUMMARY OF THE INVENTION

The present invention intends to solve such problems of the prior art as mentioned above and its object is to reduce the quantity of electric power consumption by supplying subscriber transmitter-receivers with only the amount of electric power which corresponds to a specific number of subscribers.

According to the present invention:

(1) A transmission apparatus is provided on the subscriber side in a subscriber transmission system wherein a subscriber side transmission apparatus servicing a plurality of subscribers and a transmission apparatus connected to a switching system are coupled through multiplexed transmission lines with two memories which store calling and terminating signals, respectively, and a controller which causes only subscriber transmitter-receivers corresponding to a specific number of subscribers of the subscriber transmitter-receivers for transmitting and receiving the signals of the subscriber lines, to be in an operating state, and which causes the memories to operate, and only such circuits in the transmission apparatus of the subscriber side as to correspond to a specific number of subscribers are supplied with electric power by controlling, via the controller, the amount of power supplied when the rate of telephone use is low.

(2) In a transmission apparatus of the subscriber side, which has a subscriber transmitter-receiver provided with a number of circuits for sending and receiving signals of subscriber lines which correspond to a plurality of subscribers, a signal multiplexer-demultiplexer for multiplexing and demultiplexing transmitted and received signals of the subscriber transmitter-receiver, and a transmission signal transmitter-receiver for transmitting and receiving signals which the signal multiplexer-demultiplexer multiplexes and demultiplexes, and which is provided in a subscriber transmission system which is further provided with a transmission apparatus of the switching system side, which has a subscriber transmitter-receiver provided with a number of circuits for transmitting and receiving signals to and from the switching system which correspond to a plurality of subscribers, a signal multiplexer-demultiplexer for multiplexing and demultiplexing transmitted and received signals of the subscriber transmitter-receiver, and a transmission signal transmitter-receiver for transmitting and receiving signals which the signal multiplexer-demultiplexer multiplexes and demultiplexes, and which connects the two transmission signal transmitter-receivers via transmission lines.

The apparatus is further provided with a memory for temporarily storing call signals originating from the subscriber transmitter-receiver in the preceding stage of the subscriber transmitter-receiver, and with a memory for temporarily storing call signals terminating at the subscriber transmitter-receiver in the following stage of the subscriber transmitter-receiver; and with a controller which causes only subscriber transmitter-receivers of the subscriber transmitter-receivers which correspond to a specific number of subscribers to be set in an operating state and which causes the memories to operate. When the rate of telephone use is low, electric power is supplied only to the number of circuits in the transmission apparatus of the subscriber side that correspond to a specific number of subscribers, by controlling the amount of power supplied with the controller.

(3) In (1) or (2), the controller is provided with a service shift switch for making a shift to set the subscriber transmitter-receivers corresponding to a specific number of subscribers according to control information from outside, a phase adjuster for controlling the operation phases in the two memories according to a shift of the service shift switch, a timing controller for controlling the timing of read and write in memories, and a transmitter-receiver shift commander responsive to a shift of the service shift switch for issuing shift commands which set the subscriber transmitter-receivers corresponding to a specific number of subscribers in the subscriber transmitter-receivers.

(4) In (3), control information for the service shift switch is transmitted from the transmission apparatus of the switching system side by means of multiplexed signals, demultiplexed by the signal multiplexer-demultiplexer in the transmission apparatus of the subscriber side and supplied to the controller.

(5) In (1) or (2), the transmission apparatus of the switching system side is provided with a controller for issuing control information which causes only subscriber transmitter-receivers which correspond to a specific number of subscribers to be set in an operating state and which causes the memories to operate. The control information is transmitted from the transmission apparatus of the switching system side by means of multiplexed signals and in the transmission apparatus of the subscriber side, each control is performed on the basis of the control information demultiplexed in the signal multiplexer-demultiplexer.

(6) In (1) or (2), there is provided an electric power feeding controller for supplying a DC power from a battery when a commercial power source has failed in an AC/DC converter for supplying DC power which causes the transmission apparatus of the subscriber side to operate, and when supplying battery power, for controlling so that the controller sets only the subscriber transmitter-receivers corresponding to a specific number of subscribers in an operating state and causes the memories to operate.

(7) In (6), the electric power feeding controller is provided with a power source monitor for detecting a stoppage of DC power supply from the AC/DC converter, a to-battery changer for supplying a DC power source from the battery on the detection of a stoppage of the DC power source, a power distributor for distributing DC power from the AC/DC converter or the to-battery changer to within the transmission apparatus, and a power source changer responsive to control information from outside for controlling so as to stop the DC power supply from the AC/DC converter in the power source monitor, to supply DC power from the battery in the to-battery changer, and in the power distributor to distribute DC power from the to-battery changer to within the transmission apparatus.

(8) In (7), control information for the power source changer is transmitted from the transmission apparatus of the switching system side by means of multiplexed signals and is demultiplexed by the signal multiplexer-demultiplexer in the transmission apparatus of the subscriber side to be provided to the electric power feeding controller.

BRIEF DESCRIPTION OF THE DRAWINGS

The present invention will be more clearly understood from the description as set forth below with reference to the accompanying drawings wherein.

DESCRIPTION OF THE PREFERRED EMBODIMENTS

Figure 1:
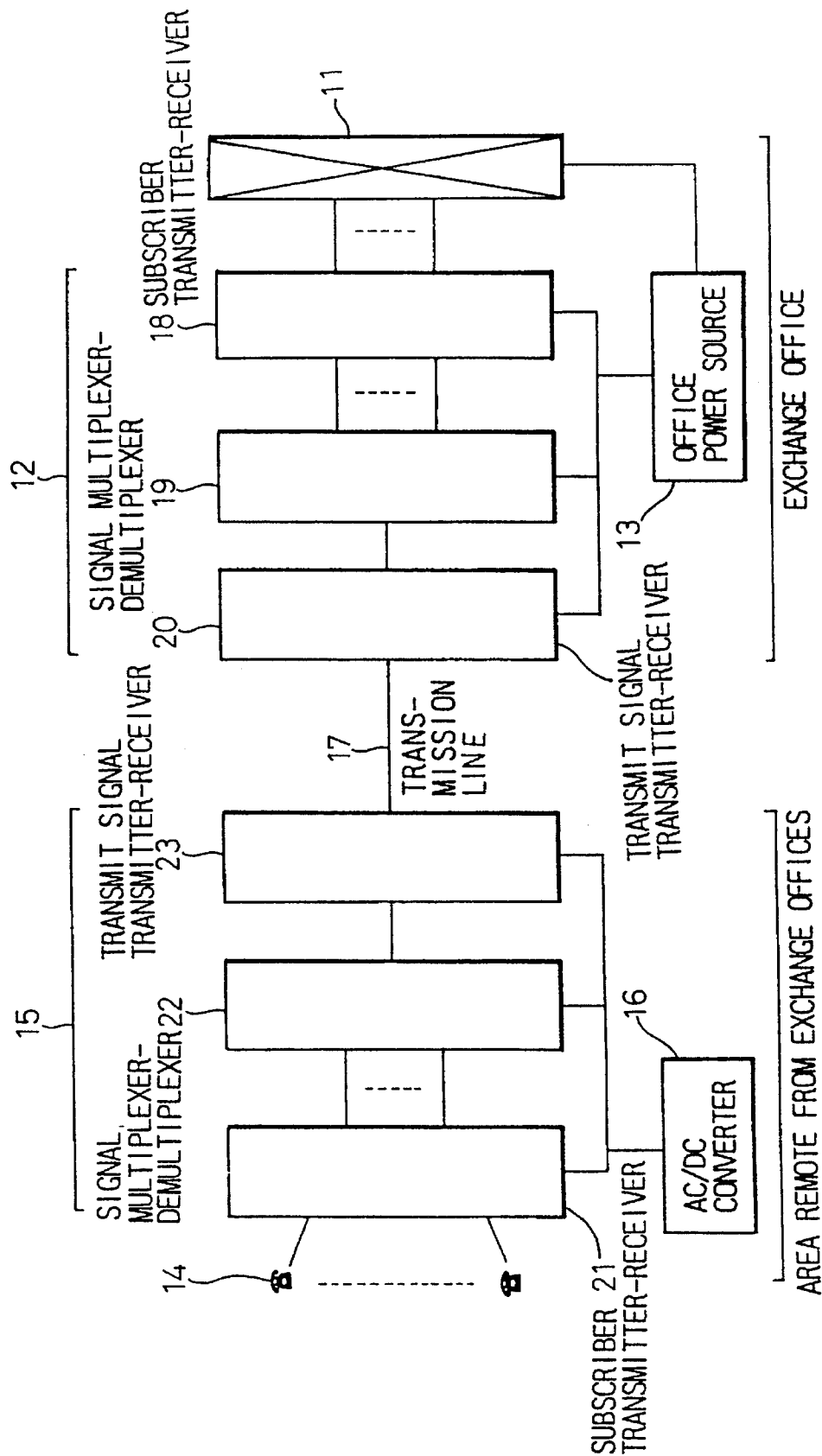
FIG. 1 is a diagram showing a related art subscriber transmission system.

Before describing the preferred embodiments according to the present invention, examples of the related art are provided with reference to accompanying drawings (FIG. 1).

FIG. 1 shows a related art subscriber transmission system. In the figure, reference numeral 11 denotes a switching system, 12 denotes a transmission apparatus of the switching system side, 13 denotes an office power supply for the switching system 11 and the transmission apparatus 12, and these are provided in an exchange office. Reference numeral 14 denotes subscribers, 15 denotes a transmission apparatus of the subscriber side, 16 denotes an AC/DC converter for supplying power to each section of the transmission apparatus 15, and these are located in a remote area from the exchange office. Reference numeral 17 denotes a transmission line such as an optical transmission line for connecting the transmission apparatuses 12 and 15.

In the transmitter of the switching system side, reference numeral 18 denotes a subscriber transmitter-receiver, 19 denotes a signal multiplexer-demultiplexer, and 20 denotes a transmission signal transmitter-receiver. The subscriber transmitter-receiver 18 transmits and receives a voice signal and various control signals to and from the switching system 11. The signal multiplexer-demultiplexer 19 multiplexes and connects the signal of the subscriber transmitter-receiver 18 to a transmission signal transmitter-receiver 20 and demultiplexes and connects the multiplexed signal from the transmission signal transmitter-receiver 20 to the subscriber transmitter-receiver 18. The transmission signal transmitter-receiver 20 transmits and receives multiplexed signals between the signal multiplexer-demultiplexer 19 and the transmission line 17.

In the transmission apparatus 15 of the subscriber side, reference numeral 21 denotes a subscriber transmitter-receiver, 22 denotes a signal multiplexer-demultiplexer, and 23 denotes a transmission signal transmitter-receiver. The subscriber transmitter-receiver 21 transmits and receives a voice signal and various control signals to and from the subscribers 14. The signal multiplexer-demultiplexer 22 multiplexes and connects the signal of the subscriber transmitter-receiver 21 to a transmission signal transmitter-receiver 23 and demultiplexes and connects the multiplexed signal from the transmission signal transmitter-receiver 23 to the subscriber transmitter-receiver 21. The transmission signal transmitter-receiver 23 transmits and receives multiplexed signals between the signal multiplexer-demultiplexer 22 and the transmission line 17.

In a conventional subscriber transmission system as shown in FIG. 1, since all of the subscriber transmitter-receivers 21 in the transmission apparatus 15 of the subscriber side are connected to subscribers, all of the devices are always supplied with electric power.

However, in the subscriber transmission system, the telephone use rate of the subscribers connected to the subscriber side transmission apparatus is often low. Therefore, there is a problem that supplying all the subscriber transmitter-receivers with electric power results in a waste of electric power in connection with the rate of device use.

Figure 2:
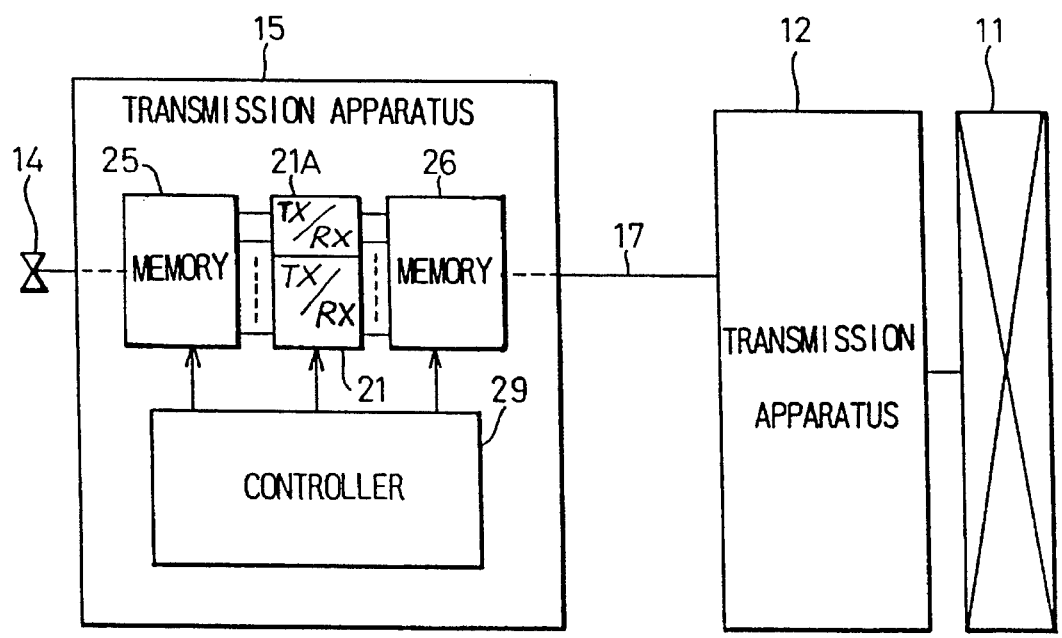
FIG. 2 is a diagram showing a fundamental architecture of the present invention.

Next, FIG. 2 is a diagram showing a fundamental architecture of the present invention.

(1) A subscriber transmission system for which the present invention is intended is one which connects a transmission apparatus 15 of the subscriber side, which serves a plurality of subscribers, and a transmission apparatus 12 connected to a switching system by means of multiplexed transmission lines.

In this case, the transmission apparatus of the subscriber side is provided with memories 25 and 26 which store originating and terminating call signals respectively and a controller which causes only such subscriber transmitter-receivers 21A, in the subscriber transmitter-receivers 21 for transmitting and receiving the signals of the subscriber lines so as to correspond to a specific number of subscribers, to be in an operating state, and which causes the memories to operate.

Therefore, when the rate of telephone use is low, controlling by the controller 29 as described above, it is possible to provide electric power only to the circuits corresponding to a specific number of subscribers in the transmission apparatus 15 of the subscriber side and accordingly to reduce the amount of power consumption in the transmission apparatus 15 of the subscriber side.

(2) A subscriber transmission system for which the present invention is intended is one wherein a transmission apparatus 15 of the subscriber side is provided with a subscriber transmitter-receiver 21 including circuits for transmitting and receiving signals of the subscriber lines in response to a plurality of subscribers 14, a signal multiplexer-demultiplexer 22 for multiplexing and demultiplexing transmitted and received signals of the subscriber transmitter-receiver and a transmission signal transmitter-receiver 23 for transmitting and receiving signals the signal multiplexer-demultiplexer multiplexes and demultiplexes. A transmission apparatus 12 is provided with a subscriber transmitter-receiver 18 including circuits for transmitting and receiving signals to and from a switching system in response to a plurality of subscribers, a signal multiplexer-demultiplexer 19 for multiplexing and demultiplexing transmitted and received signals of the subscriber transmitter-receiver and a transmission signal transmitter-receiver 20 for transmitting and receiving signals the signal multiplexer-demultiplexer multiplexes and demultiplexes, and the transmission signal transmitter-receivers 23 and 20 are connected to each other via transmission lines.

A memory 25 is provided in the preceding stage of the subscriber transmitter-receiver 21 to temporarily store the call signals originating therefrom. A memory 26 is provided in the following stage of the subscriber transmitter-receiver 21 to temporarily store the call signals terminating thereat. And, a controller 29 is provided to gain control so as to cause only the subscriber transmitter-receivers 21A, in the subscriber transmitter-receivers, which correspond to a specific number of subscribers to be set in an operating state and to cause the memories 25 and 26 to operate.

Therefore, when the rate of telephone use is low, by means of such control by controller 29 as described above, it is possible to provide electric power only to the circuits corresponding to a specific number of subscribers in the transmission apparatus 15 of the subscriber side and accordingly to reduce the amount of power consumption in the transmission apparatus 15 of the subscriber side.

(3) In the case of (1) or (2), the controller 29 can be realized by providing a service shift switch 41 for making a shift to set the subscriber transmitter-receivers 21A corresponding to a specific number of subscribers according to control information from outside, a phase adjuster 42 for controlling the operation phases in the two memories 25 and 26 according to a shift of the service shift switch 41, a timing controller 43 and 44 for controlling the timing of read and write in memories, and a transmitter-receiver shift commander 45 responsive to a shift of the service shift switch 41 for issuing shift commands which set the subscriber transmitter-receivers 21A corresponding to a specific number of subscribers in the subscriber transmitter-receivers 21.

(4) In the case of (3), control information for the service shift switch 41 may be transmitted from the transmission apparatus 12 of the switching system side by means of multiplexed signals and may be separated from the multiplexed signals by the signal multiplexer-demultiplexer 22 in the transmission apparatus 15 of the subscriber side to be supplied to the controller 29.

(5) Alternatively in (1) or (2), the transmission apparatus 12 of the switching system side may be provided with a controller 31 to issue control information which causes only subscriber transmitter-receivers 21A corresponding to a specific number of subscribers to be set in an operating state and which causes the memories 25 and 26 to operate. Then, the control information is transmitted from the transmission apparatus 12 by means of multiplexed signals, which are demultiplexed by the signal multiplexer-demultiplexer 22 in the transmission apparatus 15 of the subscriber side, where various controls are performed on the basis of the separated control information.

(6) In case of (1) or (2), the transmission apparatus 15 of the subscriber side can be provided with an electric power feeding controller 33 to supply a DC power source from a battery 32 when commercial power source for an AC/DC converter 16 has failed, and in this situation, it is possible to make the controller 29 control so as to set only the subscriber transmitter-receivers 21A corresponding to a specific number of subscribers in an operating state and to cause the memories 25 and 26 to operate.

(7) In case of (6), the electric power feeding controller 33 can be realized by providing a power source monitor 51 for detecting a stoppage of DC power supplied from the AC/DC converter 16, a to-battery changer 52 for supplying a DC power from the battery 32 on the detection of a stoppage of the DC power source, a power distributor 53 for distributing a DC power from the AC/DC converter 16 or the to-battery changer 52 to within the transmission apparatus 15, and a power source changer 54 responsive to control information from outside for controlling so as to stop the DC power supplied from the AC/DC converter 16 in the power source monitor 51, to supply DC power from the battery 32 in the to-battery changer 52, and in the power distributor 53 to distribute DC power from the to-battery changer 52 to within the transmission apparatus 15.

(8) In case of (7), control information for the power source changer 54 can be transmitted from the transmission apparatus 12 of the switching system side by means of multiplexed signals and can be demultiplexed by the signal multiplexer-demultiplexer 22 in the transmission apparatus 15 of the subscriber side to be provided to the electric power feeding controller 33.

Figure 3:
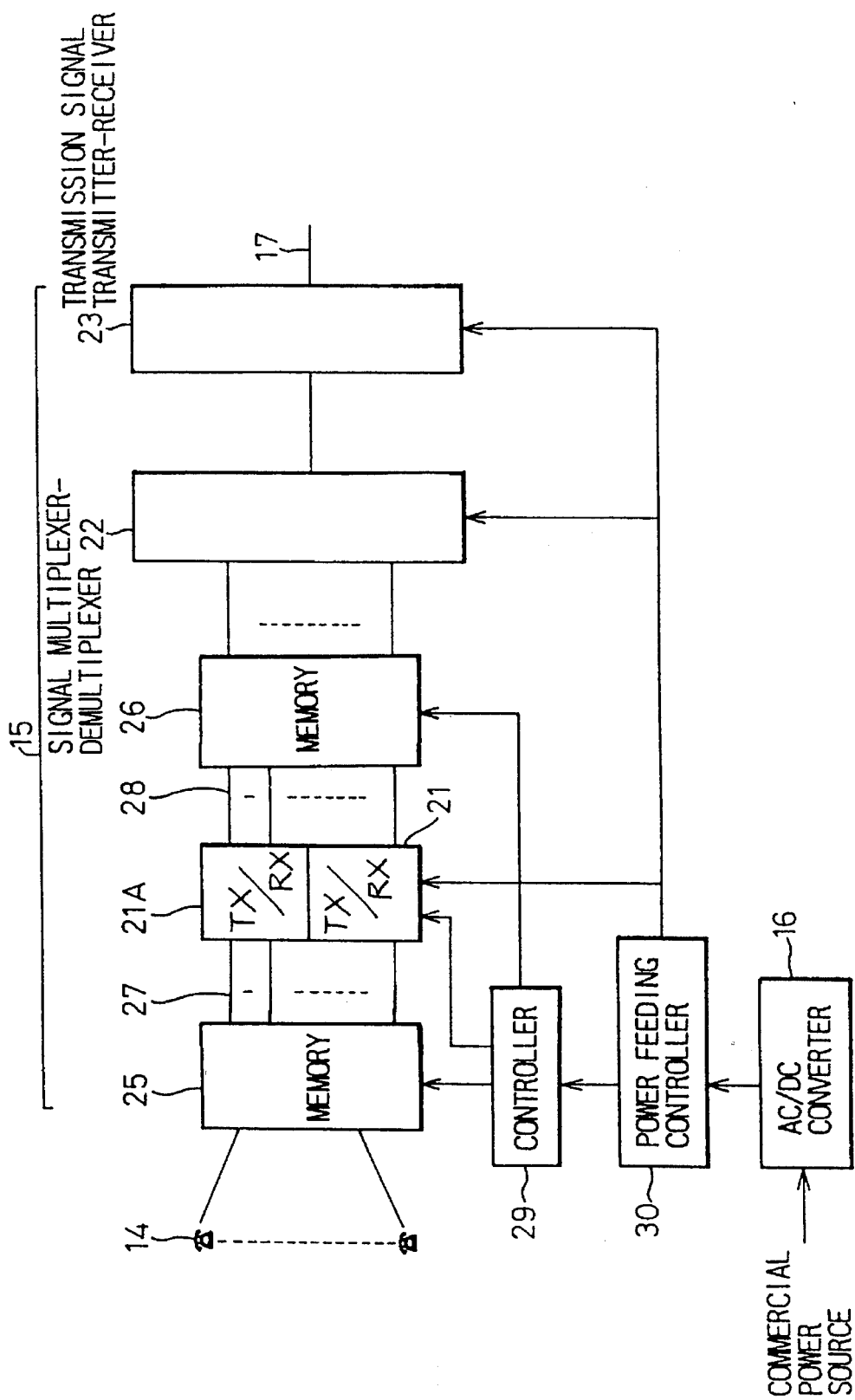
FIG. 3 is a diagram showing a first embodiment of the invention.
Figure 7:
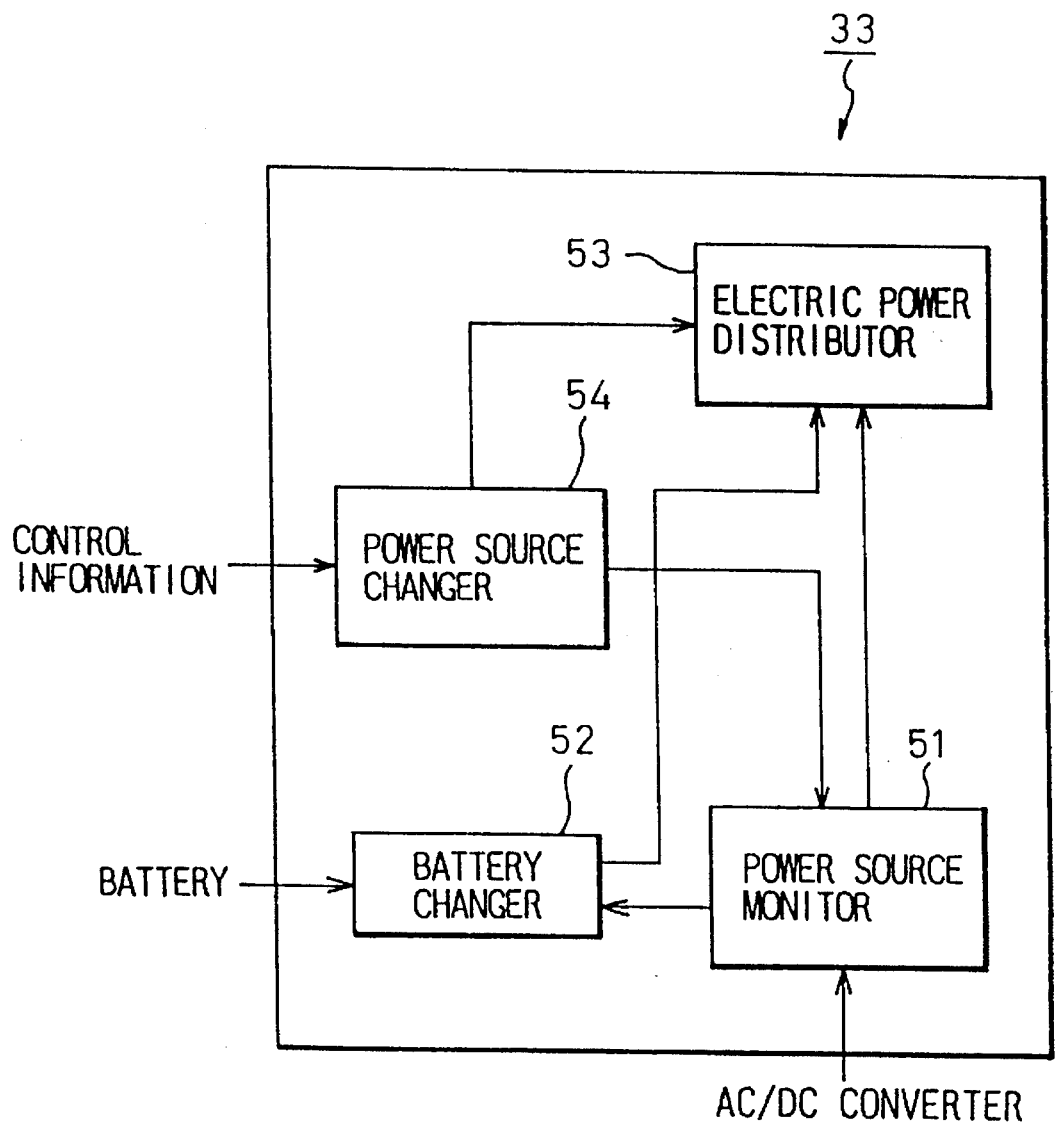
FIG. 7 is a diagram showing an illustrative constitution of the electric power feeding controller in the embodiment in FIG. 6.

FIG. 3 shows a first embodiment of the present invention in a case where required controls are effected in the transmission apparatus of the subscriber side. The same elements as in FIG. 7 are denoted with the same reference numerals. Reference numeral 21A denotes subscriber transmitter-receivers of a specific part of the subscriber transmitter-receivers 21, numerals 25 and 26 denote memories. Reference numerals 27 and 28 denote circuit-controlled subscriber's signaling lines for connecting memories 25 and 26 with the subscriber transmitter-receiver 21A.

Reference numeral 29 denotes a controller, which controls the operation of memories 25 and 26 and setting of subscriber transmitter-receivers 21A. Numeral 30 denotes an electric power feeding controller, which controls power supplied to each part within the transmission apparatus 15.

In the embodiment shown in FIG. 3, the controller 29 sets subscriber transmitter-receivers 21A corresponding to a specific number of subscribers in the subscriber transmitter-receivers 21 when the rate of telephone use is low. Because such setting may be carried out even when originating a call or conversation, the subscriber and switching system sides are provided with respective memories, which temporarily store originating and terminating call signals from subscribers and the switching system. It is noted that in this state the subscriber transmitter-receivers which are not set as a specific subscriber transmitter-receiver 21A in the subscriber transmitter-receivers 21 will stop their operation and so consume no electric power.

In this state, an originating call signal from a subscriber 14 is temporarily stored in the memory 25, and an originating call signal demultiplexed in the signal multiplexer-demultiplexer 22 is temporarily stored in the memory 26, and they are both connected to subscriber transmitter-receiver 21A through circuit-controlled subscriber's signaling lines. After the subscriber transmitter-receiver 21A has been set, calling signals and voice signals are connected directly to the subscriber transmitter-receiver 21A without passing through the memories.

The electric power feeding controller 30 ordinarily supplies DC power source from the AC/DC converter to the transmission signal transmitter-receiver 23, the signal multiplexer-demultiplexer 22 and the subscriber transmitter-receiver 21. When the rate of telephone use is low, the DC power source is supplied only to subscriber transmitter-receivers 21A, corresponding to a specific number of subscribers, which has been set according to the control of the controller 29.

Therefore, according to the embodiment as shown in FIG. 3, when the rate of telephone use is low in a transmission apparatus of the subscriber side, the amount of power consumption in a transmission apparatus of the subscriber side can be reduced because the number of the operating subscriber transmitter-receivers can be reduced.

Figure 4:
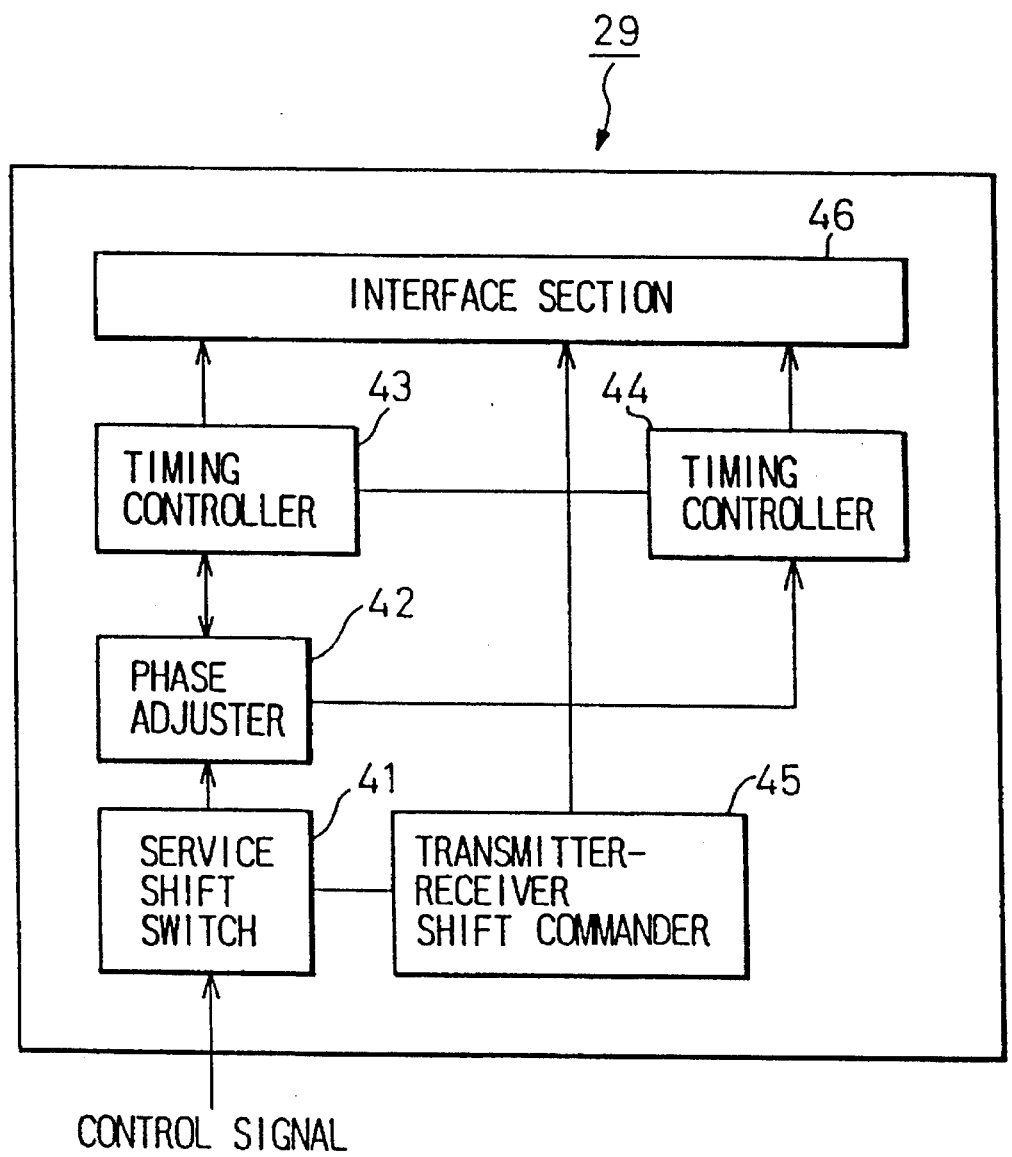
FIG. 4 is a diagram showing an illustrative constitution of the embodiment in FIG. 3.

FIG. 4 shows an illustrative constitution of the controller in the embodiment in FIG. 3. As shown in the figure, reference numeral 41 denotes a service shift switch, which changes the setting of the subscriber transmitter-receivers 21A corresponding to a specific number of subscribers in accordance with control information from outside when the rate of telephone use is low. The control information for the service shift switch 41 is sent, for example, from the transmission apparatus 12 of the switching system side via a transmission line 17 as a multiplexed signal and is demultiplexed in the signal multiplexer-demultiplexer 22 in the transmission apparatus of the subscriber side to be supplied to the controller 29.

Reference numeral 42 denotes a phase adjuster, which controls the operating phase in the memories 25 and 26 in response to a shift of the service shift switch 41. Numerals 43 and 44 are timing controllers, which control the timing of write and read in the memories 25 and 26 in response to phase adjustments from the phase adjuster 42.

Reference numeral 45 denotes a transmitter-receiver shift commander, which issues shift commands for setting subscriber transmitter-receivers 21A corresponding to a specific number of subscribers in the subscriber transmitter-receivers 21. Reference numeral 46 denotes an interface section, which transfers timing control information from the timing controllers 43 and 44 to the memories 25 and 26 and shift commands from the transmitter-receiver shift commander 45 to the subscriber transmitter-receiver 21.

Figure 5:
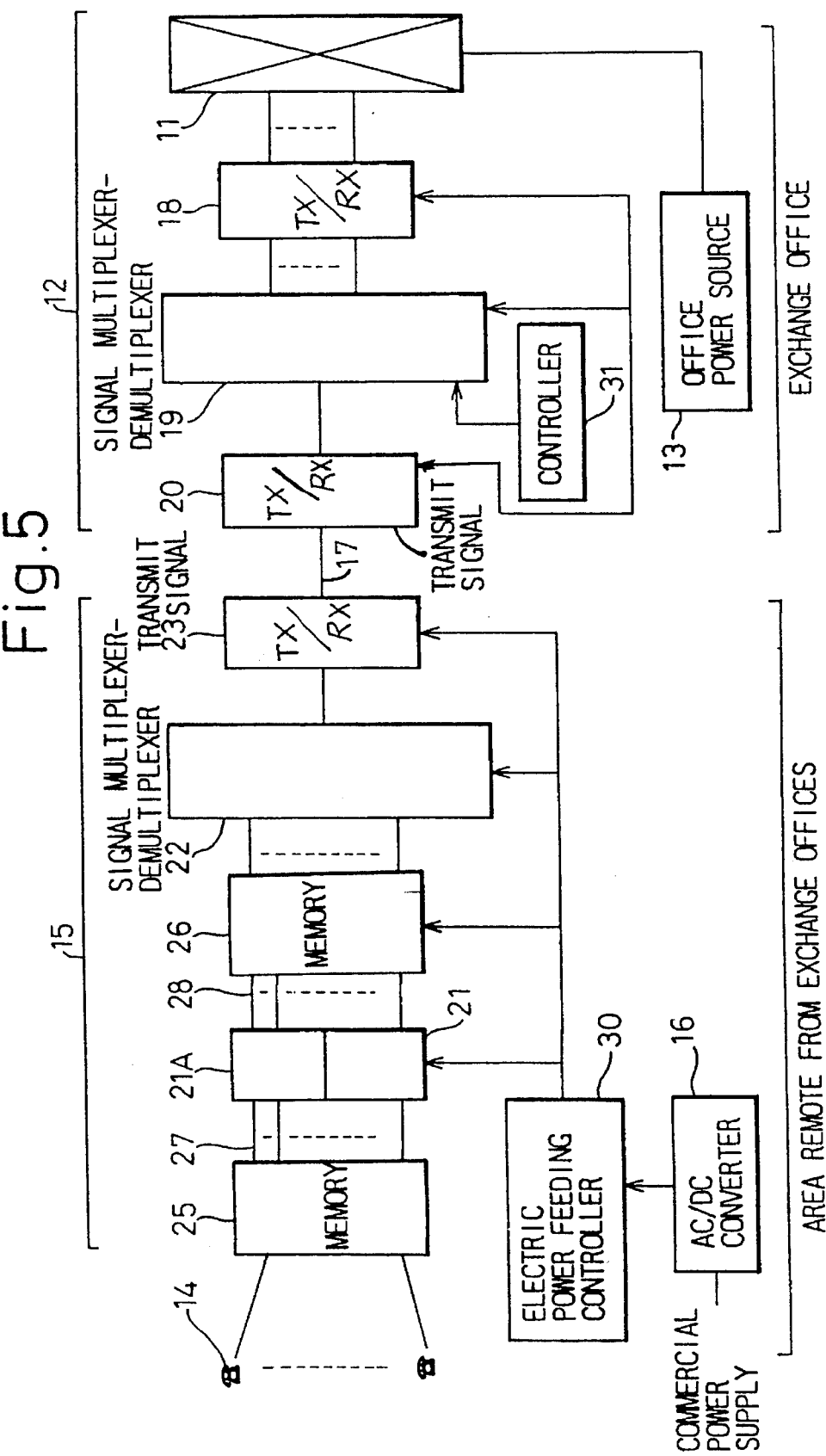
FIG. 5 is a diagram showing a second embodiment of the invention.

FIG. 5 shows a second embodiment of the present invention. This embodiment is for a case where required controls are gained from the transmission apparatus of the switching system side in such a situation as when the transmission apparatus of the switching system side is set up in an unattended office. The same elements as found in FIG. 2 or FIG. 7 are denoted with the same reference numerals. Numeral 31 denotes a controller, whose arrangement is similar to that of the controller 29 shown in the embodiment of FIG. 2, and wherein timing control information for the memories 25 and 26 and shift commands for the subscriber transmitter-receiver 21 are issued from the interface section and supplied to the signal multiplexer-demultiplexer 19 in response to a shift of the service shift switch which is based on a control signal.

The timing control information and the shift commands are converted into a multiplexed signal in the signal multiplexer-demultiplexer 19, that is, inserted into a transmission signal as an additional signal, and sent from the transmission signal transmitter-receiver 20 through the transmission line to the transmission apparatus 15. In the transmission apparatus, the information is separated in the signal multiplexer-demultiplexer 22 and supplied to the memories 25 and 26, and the subscriber transmitter-receiver 21.

Thus, the timings of write and read in the memories 25 and 26 are controlled and the setting of subscriber transmitter-receivers 21A corresponding to a specific number of subscribers in the subscriber transmitter-receivers 21 is achieved. Therefore, according to the embodiment in FIG. 5, when the rate of telephone use is low, the number of operating subscriber transmitter-receivers can be reduced in the same way as in the embodiment shown in FIG. 2, and accordingly the amount of electric power consumption in the transmission apparatus of the subscriber side can be reduced.

Figure 6:
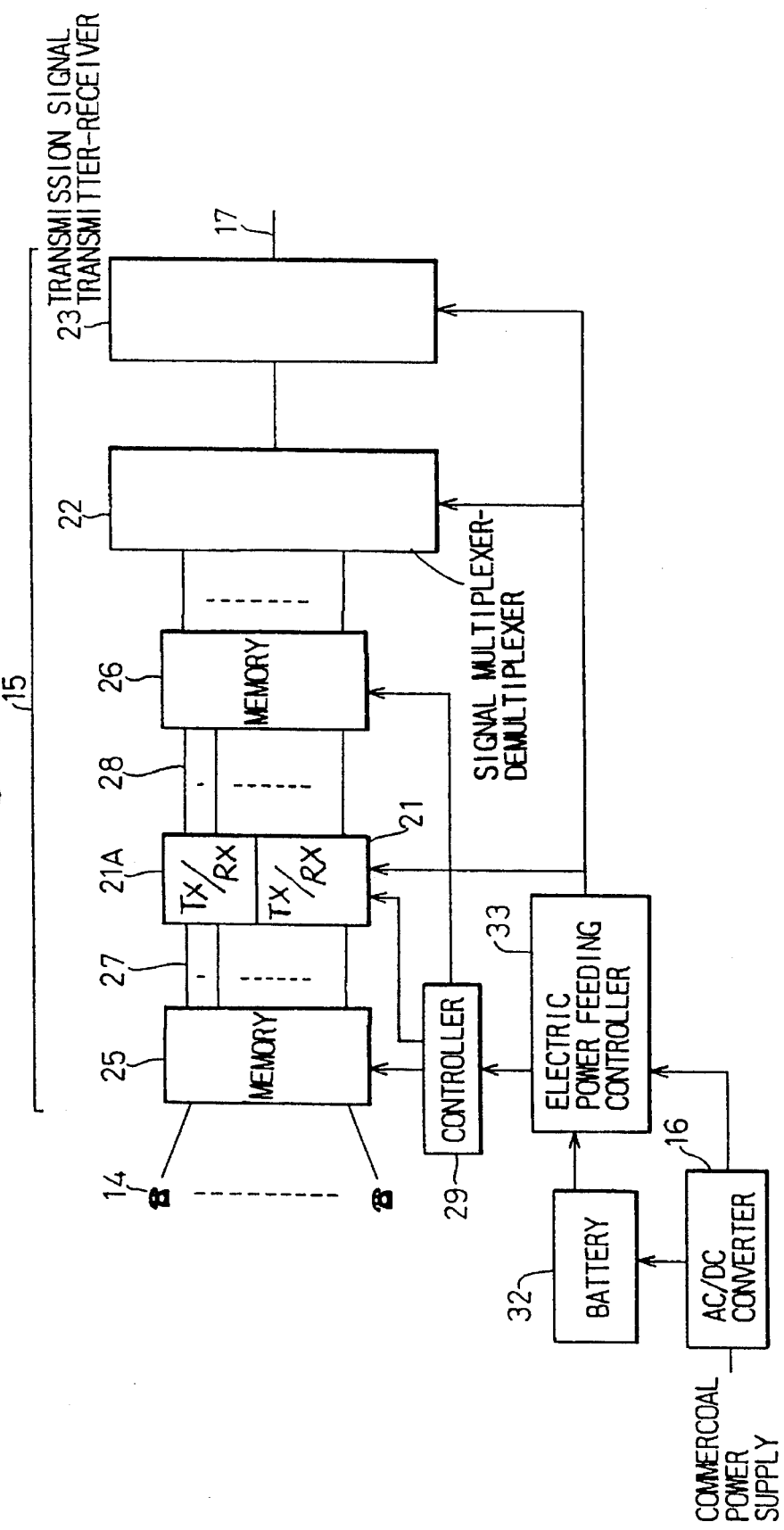
FIG. 6 is a diagram showing a third embodiment of the invention.

FIG. 6 shows a third embodiment of the invention. This embodiment is for a case where required controls are effected by applying the invention when a battery is provided as a standby power source in a transmission apparatus in the subscriber side. The same elements as in FIG. 2 are denoted with the same reference numerals. Reference numeral 32 denotes a battery, which operates as a standby power source. Reference numeral 33 denotes an electric power feeding controller, which controls power supplied to each part within the transmission apparatus 15.

The electric power feeding controller 33 ordinarily supplies DC power from the AC/DC converter 16 based on the commercial power supplied to each part within the transmission apparatus 15. The battery 32 is always being charged by DC power from the AC/DC converter 16.

When the commercial power supply stops, DC power supplied from the AC/DC converter 16 stops, then detecting the stoppage, the electric power feeding controller 33 connects the battery 32 and supplies DC power therefrom to each part within the transmission apparatus 15. At the same time, the electric power feeding controller 33 gives the controller 29 a command to set so that only subscriber transmitter-receivers 21A corresponding to a specific number of subscribers in the subscriber transmitter-receivers 21 are in an operating state.

In this way, low power operation is performed in the transmission apparatus 15, which enables a reduction of power consumption of the battery 32 and therefore a prolongation of the available time of the battery 32 can be used.

FIG. 7 shows an illustrative constitution of the electric power feeding controller in the embodiment of FIG. 6. As shown in the figure, reference numeral 51 denotes a power source monitor, which detects a stoppage of DC power supplied from the AC/DC converter 16. Numeral 52 denotes a battery changer, which supplies DC power from the battery 32 when a stoppage of the DC power supplied from the AC/DC converter 16 is detected. Numeral 53 denotes an electric power distributor, which distributes DC power supplied from the AC/DC converter 16 or the battery changer 52 to each part within the transmission apparatus 15.

It should be noted that instead of DC power from the AC/DC converter 16, DC power from the battery changer 52 may be distributed within the transmission apparatus 15 compulsively by control from outside. In FIG. 7, reference numeral 54 denotes a power source changer responsive to control information from outside, which controls and causes the power source monitor 51 to stop DC power from the AC/DC converter 16, which causes battery changer 52 to set itself in a state in which DC power is supplied from the battery 32, and the electric power distributor 53 to supply DC power from the battery 32 to each part within the transmission apparatus 15.

If the transmission apparatus 15 of the subscriber side is set up in an unattended office, the control information for controlling the power source changer 54 is transmitted from the transmission apparatus 12 of the switching system side by means of a multiplexed signal, and is separated from the multiplexed signal by the signal multiplexer-demultiplexer 22 in the transmission apparatus 15 in the subscriber side to be supplied to the electric power feeding controller 33.

As described above, according to the invention, in a subscriber transmission system wherein a plurality of subscriber terminals are concentrated and connected to an exchange office via optical transmission lines, etc., it is possible to reduce the power supplied to a transmission apparatus of the subscriber side when the rate of telephone use is low.

I claim:

1. In a subscriber transmission system having:

a transmission apparatus of a subscriber side including a subscriber transmitter-receiver provided according to a plurality of subscribers with circuits for transmitting and receiving signals of subscriber lines, a subscriber side signal multiplexer-demultiplexer for multiplexing and demultiplexing transmitted and received signals of said subscriber transmitter-receiver, and a transmission signal transmitter-receiver for transmitting and receiving signals, which said subscriber side signal multiplexer-demultiplexer multiplexes and demultiplexes, and a transmission apparatus of a switching system side including a subscriber transmitter-receiver provided according to a plurality of subscribers with circuits for transmitting and receiving signals to and from a switching system, a switching system side signal multiplexer-demultiplexer for multiplexing and demultiplexing transmitted and received signals of said subscriber transmitter-receiver, and a transmission signal transmitter-receiver for transmitting and receiving signals, which said switching system side signal multiplexer-demultiplexer multiplexes and demultiplexes, wherein said transmission apparatus of the subscriber side and said transmission apparatus of the switching system side are interconnected via transmission lines, an improvement of the subscriber side comprising:

a memory for temporarily storing call signals originating from said subscriber transmitter-receiver, a memory for temporarily storing call signals terminating in said subscriber transmitter-receiver and a controller for causing only a specific number of subscriber transmitter-receivers corresponding to a specific number of subscribers to be in an operating state and causing said memories to operate, electric power being supplied only to circuits which correspond to said specific number of subscribers in said transmission apparatus of the subscriber side.

2. A subscriber transmission system as defined in claim 1 wherein said controller includes: a service shift switch for shifting the setting of subscriber transmitter-receivers corresponding to said specific number of subscribers in response to external control information, a phase adjuster for controlling the operating phase in said memories in response to a shift of said service shift switch, a timing controller for controlling the timing of write and read in said memories in response to phase adjustment from the phase adjuster, and a transmitter-receiver shift commander for issuing shift commands for setting said subscriber transmitter-receivers corresponding to said specific number of subscribers in the subscriber transmitter-receivers in response to a shift of said service shift switch.

3. A subscriber transmission system as defined in claim 2 wherein said control information for said service shift switch is transmitted from the transmission apparatus of the switching system side by means of a multiplexed signal, and demultiplexed by a signal multiplexer-demultiplexer in the transmission apparatus of the subscriber side to be given to said controller.

4. A subscriber transmission system as defined in claim 1, wherein said transmission apparatus of the switching system side is provided with a controller for generating control information to cause only said subscriber transmitter-receivers corresponding to a specific number of subscribers to be in an operating state and to cause said memories to operate, said control information being transmitted from said transmission apparatus, and in said transmission apparatus of the subscriber side, said each control is performed on the basis of said control information separated in a signal multiplexer-demultiplexer.

5. A subscriber transmission system as defined in claim 1, wherein there is provided an electric power feeding controller for controlling so that DC power source is supplied from a battery at a time of stoppage of a commercial power supply in an AC/DC converter for supplying DC power causing said transmission apparatus of the subscriber side to operate, and when said battery power is supplied, said controller sets only said subscriber transmitter-receivers corresponding to a specific number of subscribers in an operating state and causes said memories to operate.

6. A subscriber transmission system as defined in claim 5 wherein said electric power feeding controller has a power source monitor for detecting the stoppage of DC power supplied from said AC/DC converter, a battery changer for supplying DC power source from the battery in response to said detection of the stoppage of DC power, an electric power distributor for distributing DC power from said AC/DC converter or DC power source from said battery changer to within said transmission apparatus, and a power source changer responsive to control information from outside for stopping, in said power source monitor, DC power supplied from said AC/DC converter, in said battery changer for supplying DC power source from said battery, in said electric power distributor for distributing DC power source from said battery changer to within said transmission apparatus.

7. A subscriber transmission system as defined in claim 6 wherein the control information for said power source changer is transmitted from the transmission apparatus of the switching system side by means of a multiplexed signal, and demultiplexed by a signal multiplexer-demultiplexer in the transmission apparatus of the subscriber side to be given to said electric power feeding controller.

8. A subscriber transmission system wherein a transmission apparatus of a subscriber side servicing a plurality of subscribers, and a transmission apparatus connected to a switching system, are interconnected via multiplexed transmission lines, said transmission apparatus of the subscriber side, comprising:

subscriber transmitter-receivers for transmitting and receiving signals of subscriber lines;

memories for storing originating and terminating call signals respectively;

a controller for causing only a specific number of said subscriber transmitter receivers to be in an operating state, for causing said memories to operate, and for supplying electric power from a source only to circuits corresponding to said specific number of subscribers in said transmission apparatus of said subscriber side.

9. A subscriber transmission system as defined in claim 8 wherein said controller includes: a service shift switch for shifting the setting of subscriber transmitter-receivers corresponding to a specific number of subscribers in response to external control information, a phase adjuster for controlling the operating phase in said memories in response to a shift of said service shift switch, a timing controller for controlling the timing of write and read in said memories in response to phase adjustment from the phase adjuster, and a transmitter-receiver shift commander for issuing shift commands for setting said subscriber transmitter-receivers corresponding to said specific number of subscribers in the subscriber transmitter-receivers in response to a shift of said service shift switch.

10. A subscriber transmission system as defined in claim 9 wherein said control information for said service shift switch is transmitted from the transmission apparatus of the switching system side by means of a multiplexed signal, and demultiplexed by a signal multiplexer-demultiplexer in the transmission apparatus of the subscriber side to be given to said controller.

11. A subscriber transmission system as defined in claim 1, wherein said transmission apparatus of the switching system side is provided with a controller for generating control information to cause only said subscriber transmitter-receivers corresponding to a specific number of subscribers to be in an operating state and to cause said memories to operate, said control information being transmitted from said transmission apparatus, and in said transmission apparatus of the subscriber side, said each control is performed on the basis of said control information separated in a signal multiplexer-demultiplexer.

12. A subscriber transmission system as defined in claim 8, wherein there is provided an electric power feeding controller for controlling so that DC power source is supplied from a battery at a time of stoppage of a commercial power supply in an AC/DC converter for supplying DC power causing said transmission apparatus of the subscriber side to operate, and when said battery power is supplied, said controller sets only said subscriber transmitter-receivers corresponding to a specific number of subscribers in an operating state and causes said memories to operate.

13. A subscriber transmission system as defined in claim 12 wherein said electric power feeding controller has a power source monitor for detecting the stoppage of DC power supplied from said AC/DC converter, a battery changer for supplying DC power source from the battery in response to said detection of the stoppage of DC power, an electric power distributor for distributing DC power from said AC/DC converter or DC power source from said battery changer to within said transmission apparatus, and a power source changer responsive to control information from outside for stopping, in said power source monitor, DC power supplied from said AC/DC converter, in said battery changer for supplying DC power source from said battery, in said electric power distributor for distributing DC power source from said battery changer to within said transmission apparatus.

14. A subscriber transmission system as defined in claim 12 wherein the control information for said power source changer is transmitted from the transmission apparatus of the switching system side by means of a multiplexed signal, and demultiplexed by a signal multiplexer-demultiplexer in the transmission apparatus of the subscriber side to be given to said electric power feeding controller.

* * * * *